(12) United States Patent
Lee

(10) Patent No.: US 7,116,775 B2
(45) Date of Patent: Oct. 3, 2006

(54) APPARATUS AND METHOD FOR MANAGING BLF INFORMATION IN AN INTER-NETWORKING SYSTEM

(75) Inventor: Won Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 615 days.

(21) Appl. No.: 10/329,707

(22) Filed: Dec. 27, 2002

(65) Prior Publication Data

US 2003/0123639 A1   Jul. 3, 2003

(30) Foreign Application Priority Data

Dec. 28, 2001   (KR) ............ 10-2001-0087366

(51) Int. Cl.
  *H04M 3/00* (2006.01)
  *H04M 7/00* (2006.01)
(52) U.S. Cl. ................ 379/258; 379/225
(58) Field of Classification Search ........ 379/225, 379/258
See application file for complete search history.

(56) References Cited

U.S. PATENT DOCUMENTS

| 3,736,383 A | * | 5/1973 | Le Baron ............ 379/197 |
| 3,978,294 A | * | 8/1976 | Limiero et al. ........ 379/225 |
| 4,488,004 A | * | 12/1984 | Bogart et al. ......... 379/225 |
| 5,533,109 A | * | 7/1996 | Baker ............... 379/201.33 |
| 5,703,941 A | | 12/1997 | Nakajima et al. ...... 379/201 |
| 5,742,675 A | | 4/1998 | Kilander et al. ...... 379/265 |
| 5,818,921 A | * | 10/1998 | Vander Meiden et al. .. 379/225 |
| 5,930,336 A | * | 7/1999 | Junqua et al. ........ 379/88.03 |
| 6,052,461 A | * | 4/2000 | Lam ................. 379/297 |

* cited by examiner

*Primary Examiner*—Bing Q. Bui
(74) *Attorney, Agent, or Firm*—Fleshner & Kim LLP.

(57) ABSTRACT

An apparatus and corresponding method for managing busy lamp field (hereinafter, referred to as BLF) information in an inter-networking system are provided which are capable of collecting and managing BLF information of every PBX in a BLF information repeater added to the inter-networking system. The BLF information repeater reduces the load of the inter-networking system by transmitting the BLF information to a PBX that requests the BLF information.

26 Claims, 5 Drawing Sheets

| EXTENSION SYSTEM | A1 | A2 | A3 | B1 | B2 | C1 | C2 | C3 |
|---|---|---|---|---|---|---|---|---|
| PBX A | X | X | X | 1 | 1 | 0 | 2 | 0 |
| PBX B | 1 | 1 | 0 | X | X | X | 1 | 1 |
| PBX C | 2 | 1 | 0 | 1 | 1 | X | X | X |

APPARATUS AND METHOD FOR MANAGING BLF INFORMATION IN AN INTER-NETWORKING SYSTEM

BACKGROUND OF THE INVENTION

1. Field of the Invention

The invention relates to an inter-networking system. More particularly, the invention relates to an apparatus and corresponding method for managing busy lamp field (hereinafter, as BLF) information in an inter-networking system.

2. Background of the Related Art

Inter-networking means that a communication network is formed or a communication network is widened by interconnection of communication networks, such as inter-connection among/of a plurality of dispersed and independent local area networks (hereinafter LAN) or inter-connection among/of the LAN and wide area networks (WAN), to form an inter-networking system. Generally, inter-networking systems use connection only apparatuses, such as a bridge or a router and the like, to connect LANs having identical or similar communication protocols. A gateway is used in an inter-connection for communication networks which require conversion of protocol.

In an inter-networking system, a plurality of private branch exchanges (hereinafter referred to as PBX) are interworked to create a system. The system transmits status information of a subscriber, which belongs to each system (PBX), to an opposite PBX to interwork the plurality of PBXs. The status information of the PBX subscriber is transmitted as busy lamp field (hereinafter referred to as BLF) information, and the BLF information indicates the number and status of the subscriber as 1 byte.

FIG. 1 is a block diagram showing a conventional inter-networking system. As shown in FIG. 1, the inter-networking system includes a plurality of PBX, PBX A 10, PBX B 20, and PBX C 30, which exist in each sub-network. A plurality of extension subscribers A1–A3 are connected to the sub-network in which the PBX A 10 is positioned, a plurality of extension subscribers B1, B2 are connected to the sub-network in which the PBX B 20 is positioned, and similarly a plurality of extension subscribers C1–C3 are connected to the sub-network in which the PBX C 30 is positioned. The plurality of PBX 10–30 are mutually connected to each other, and communicate by sending and receiving BLF information according to a BLF information requesting message of the extension subscriber, that is, extension status report message (BLF Req. Status report message).

The sub-network is also called as a sub-net. The term sub-net means a network which can be recognized as a part, which is divided separably, even though it belongs to an organization. Generally, a sub-network connects all computers in a region, building or LAN, and the sub-network can be connected to the internet as a shared network address.

FIG. 2 is a flow chart showing the flow of signals between the PBX A 10 and PBX B 20 of FIG. 1 when an extension subscriber registers/unregisters registration for the extension of the PBX B 20, or removes the extension.

The communication process of each PBX in the inter-networking system will be described with reference to FIGS. 1 and 2.

Since it is not clear to a PBX which extension subscriber of its extension subscribers is registered with which key phone of an opposite PBX, the PBX transmits the BLF information of all of its extension subscribers. That is, when extension status is requested from the PBX B 20, since the PBX A 10 does not know which subscribers A1–A3 are registered with the PBX B 20, the PBX A 10 transmits the BLF information for all of its extension subscribers A1–A3 to the PBX B 20 through the BLF Req. Status Report message in step S10.

The above transmission method is a multi-casting transmission method in which one or more senders transmit data to specifically one or more receivers, and is mainly used in internet visual communicating conference. For the multi-casting transmission, data is transmitted by indicating an address of a group to which the senders belong in the header of the transmitted packet, instead of the address of the receivers.

Also, the BLF information indicates the subscriber extension status (subscriber registration or subscriber unregistration) of a PBX subscriber to another PBX in the inter-networking system, or an extension remove status of the PBX. When the BLF Req. Status Report message of the subscriber is received from the PBX, the respective PBX B 20 checks the subscriber extension status of the PBX A 10 in step S11 and transmit a BLF Res. Ack message of the subscriber to the PBX A 10 in step S12.

In the general conventional inter-networking system, each PBX does not know which of its subscribers are registered with which PBX of the opposite sub-network. Accordingly, it must transmit BLF information of all of its subscribers to every PBX. Accordingly, in an inter-networking system which interworks a plurality of PBXs as if they are one system, in case where the number of PBX or the number of subscribers of the respective PBXs increases, the amount of data that the respective PBXs must transmit is exponentially increased, thus degrading the performance of the whole system and decreasing data transmission speed.

SUMMARY OF THE INVENTION

An object of the invention is to solve at least the above problems and/or disadvantages and to provide at least the advantages described hereinafter.

To achieve these and other advantages, in whole or in part, and in accordance with the purpose of the invention, as embodied and broadly described herein, there is provided an inter-networking system including a plurality of private branch exchanges (PBXs) configured to transmit busy lamp field (BLF) information which indicates an extension status of the subscriber and a BLF information repeater configured to retransmit the BLF information among the PBXs by collecting and managing the BLF information transmitted from the PBXs. The BLF information repeater may include a reference table for managing the BLF information transmitted from each PBX.

To achieve these and other advantages, in whole or in part, and in accordance with the purpose of the invention, as embodied and broadly described herein, there is further provided a method for managing BLF information in an inter-networking system including reporting BLF information which indicates an extension status from a PBX to a BLF information repeater, managing the extension status of each PBX by storing the reported BLF information, and multicasting the reported BLF information to another PBXs with reference to the extension status of each PBX.

To achieve these and other advantages, in whole or in part, and in accordance with the purpose of the invention, as embodied and broadly described herein, there is further provided a method for managing BLF information in an inter-networking system, including requesting conversion of an extension status from a private branch exchange (PBX)

with a BLF information repeater when the extension status is converted, updating the extension status requested from the PBX in the BLF information repeater, multicasting the extension status of the updated PBX with another PBX and managing its extension status registered for the opposite PBX on the basis of the multicast extension status of the PBX, and transmitting the status of just the extension subscriber registered with the PBX when its extension status is converted.

To achieve these and other advantages, in whole or in part, and in accordance with the purpose of the invention, as embodied and broadly described herein, there is further provided an inter-networking system, including a plurality of private branch exchanges (PBXs) configured to transmit busy lamp field (BLF) information, and an interface configured to receive and re-transmit BLF information received from the plurality of PBXs.

To achieve these and other advantages, in whole or in part, and in accordance with the purpose of the invention, as embodied and broadly described herein, there is further provided a method for managing busy lamp field (BLF) information in an inter-networking system, including transmitting busy lamp field (BLF) information from one of a plurality of private branch exchanges (PBXs) to an interface, and re-transmitting the reported BLF information from the interface to another of the plurality of PBXs.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein.

DETAILED DESCRIPTION OF PREFERRED EMBODIMENTS

Reference will now be made in detail to embodiments of the invention, examples of which are illustrated in the accompanying drawings.

Figure 1:
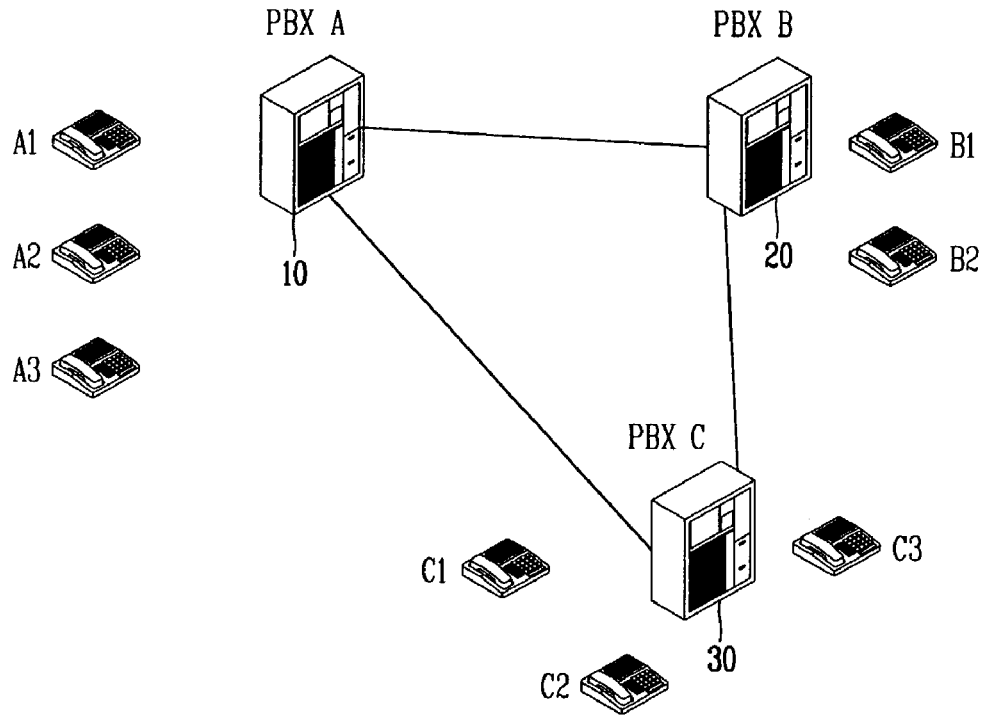
FIG. 1 is a block diagram showing a general inter-networking system according to background art.
Figure 2:
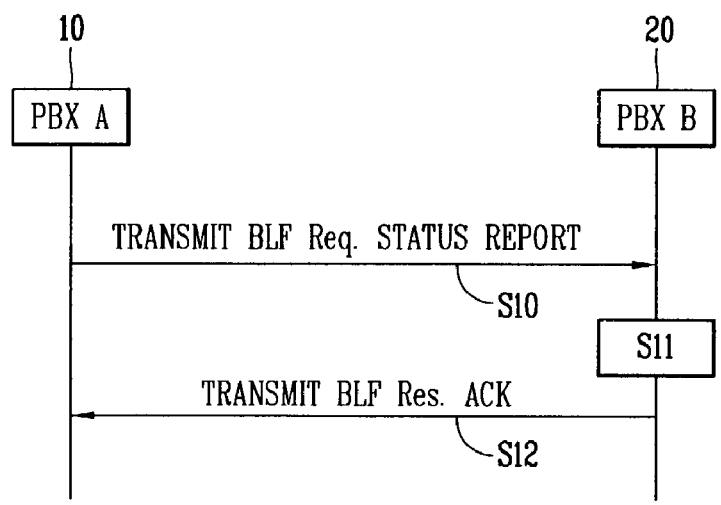
FIG. 2 is a flow chart illustrating flow of signals between a PBX A and PBX B when a subscriber of the PBX A registers/unregisters the extension of the PBX B or removes the extension according to background art.
Figure 3:
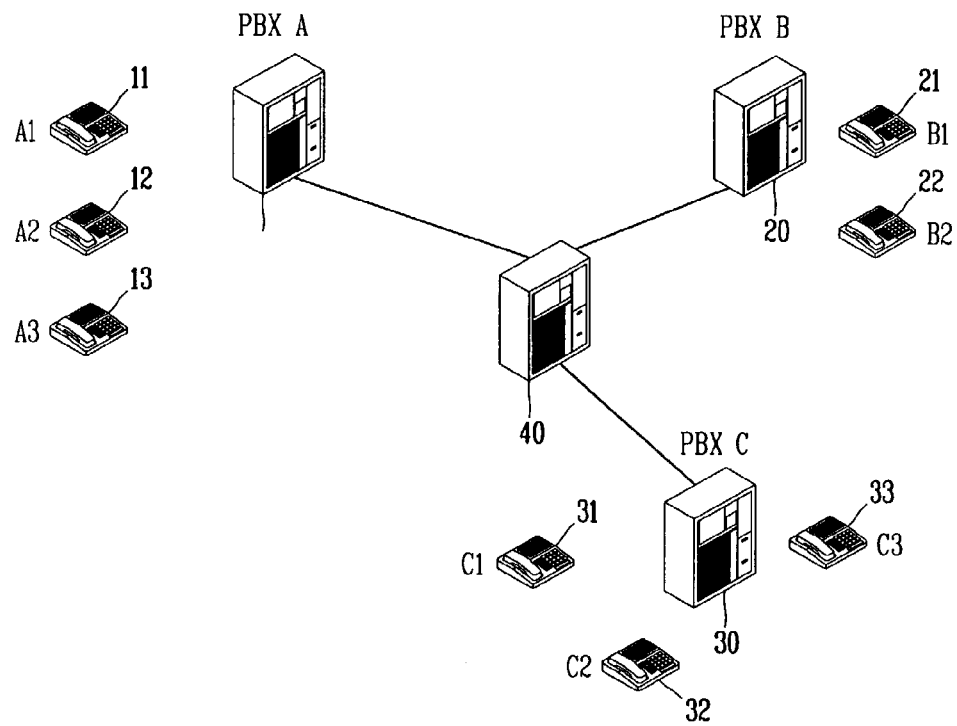
FIG. 3 is a schematic block diagram of an inter-networking system in accordance with an embodiment of the invention.

FIG. 3 is a block diagram showing an inter-networking system in accordance with an embodiment of the invention. As shown in FIG. 3, the inter-networking system in accordance with an embodiment of the invention adds an interface, such as a BLF information repeater 40, to a conventional inter-networking system such as that shown in FIG. 1. Like reference numerals have been used to designate similar parts.

In the embodiment of FIG. 3, the BLF information repeater 40 collects BLF information transmitted from each of the respective PBXs 10–30 and retransmits or multi-casts the BLF information to a corresponding PBX. The BLF information repeater 40 manages the BLF information transmitted from the respective PBXs when an extension subscriber of a specific PBX registers or unregisters an extension subscriber of an opposite PBX. In one embodiment, the BLF information repeater 40 includes a reference table for storing information, including in which PBX of an opposite sub-network an extension (subscriber) of a respective PBX is registered.

The communication process between PBXs via the BLF information repeater 40 in an inter-networking system in accordance with an embodiment of the invention will be described as follows.

Figure 4:
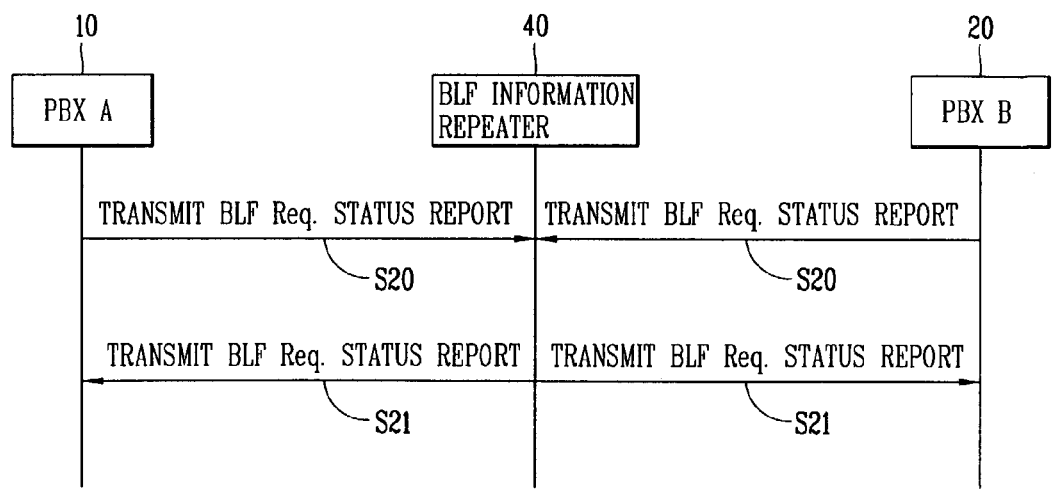
FIG. 4 is a flow chart of a communication process between a PBX A and PBX B using a BLF information repeater in an inter-networking system in accordance with an embodiment of the invention.

FIG. 4 is a flow chart illustrating the transmission process of the BLF information through the BLF information repeater 40 in an inter-networking system according to an embodiment of the invention. Respective PBXs transmit BLF information to the BLF information repeater 40 in every predetermined period of a predetermined amount of time (or whenever the extension status is converted).

The BLF information repeater 40 stores BLF information in a reference table by collecting the BLF information transmitted from all of the PBXs which exist in respectively different sub-networks, and then multicasts or re-transmits the BLF information to another PBX with reference to the extension status of each PBX shown in the corresponding reference table. In one embodiment, the BLF information is information indicating subscriber extension registration or extension clear.

For instance, as shown in FIG. 4, the PBX A 10 reports or transmits its extension status to the BLF information repeater 40 in a BLF Req. Status report message in step S20. Since information regarding in which of the PBXs of opposite sub-networks a subscriber extension (or extensions) of each PBX is registered is stored in the reference table of the BLF information repeater 40, the BLF information repeater 40 checks for the reference table for the (subscriber) extension (or extensions) of the PBX A 10 registered with the PBX B 20. The BLF information repeater 40 then transmits the status of just the (subscriber) extension (or extensions) registered with the PBX B 20 among the reported subscriber extension status in the PBX A10 in step S21. In one embodiment, the extension status is transmitted through a user datagram protocol (hereinafter, referred to as UDP).

Therefore, according to the invention, since information for every subscriber (extension status) of the PBX A 10 is not transmitted to the PBX B 20 as in the conventional devices but only the extension information of just the subscriber extension (or extensions) of PBX A 10 registered with the PBX B 20, the amount of data transmitted among the PBXs can be substantially reduced.

The UDP is one of the protocols which are the basis of the Transmission Control Protocol/Internet Protocol (TCP/IP), a set of internet standard protocols. In the TCP/IP, data is sent and received by combining one of IP, which is a protocol of a third layer of an Open Systems Interconnection (OSI), transmission control protocol (TCP), which is a protocol of a transmission layer or fourth layer of the OSI, or one of the UDPs. In the TCP, communication is initiated after setting connection, but in the UDP, data is sent to the address of the opposite party without setting connection. Therefore, transmission processing is conducted at high speed in the UDP.

Figures 5, 6:
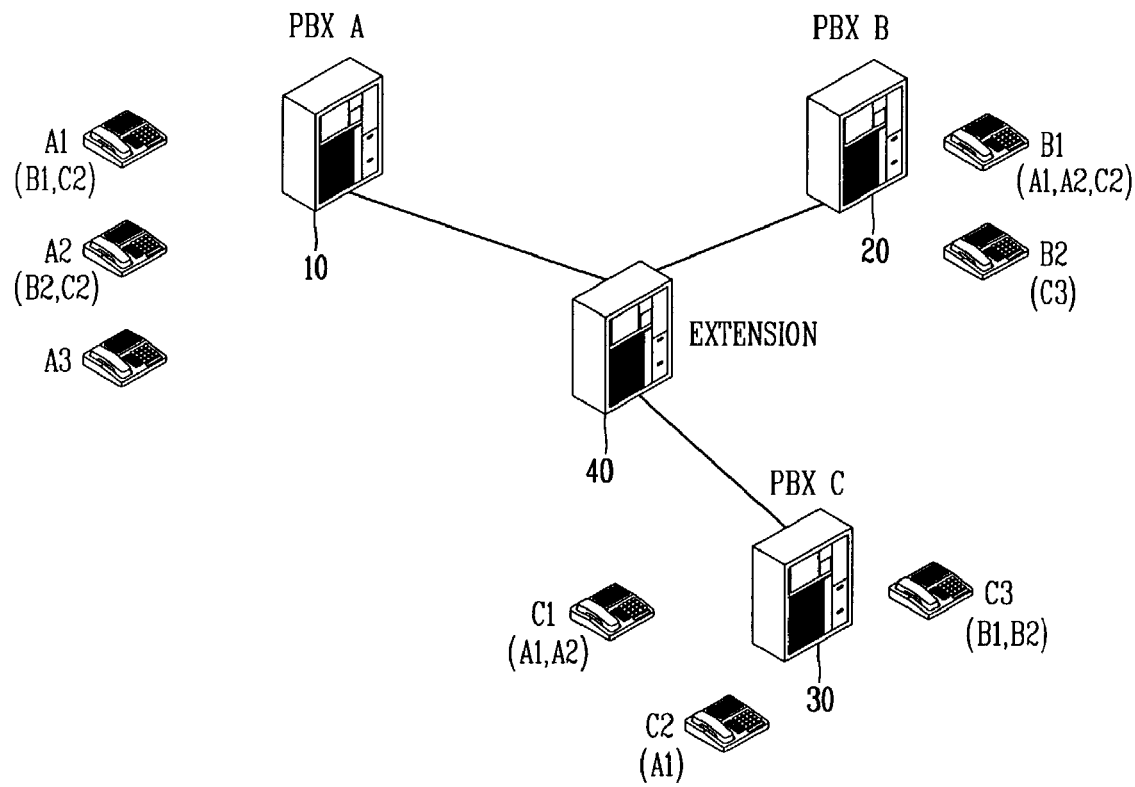
FIG. 5 is a schematic block diagram illustrating an extension status of each of the PBX in the inter-networking system of FIG. 3.
FIG. 6 is a reference table for a BLF information repeater in accordance with an embodiment of the invention.

FIG. 5 is a diagram showing an inter-networking system illustrating an extension status of each PBX in accordance with an embodiment of the invention. FIG. 6 is an example of a reference table for a BLF information repeater 40 of the inter-networking system of FIG. 5.

In the reference table of FIG. 6, the extensions of the respective PBX 10–30 managed by the BLF information repeater 40 are shown along the top of the chart. The PBXs 10, 20 and 30, which are connected by the network are shown along the left column of the chart. With reference to FIG. 6, in the PBX A 10, an extension subscriber B1 of the PBX B 20 and an extension subscriber C2 of the PBX C 30 are registered with the key phone 11 of the extension subscriber A1. An extension subscriber B2 of the PBX B 20 and an extension subscriber C2 of the PBX C 30 are registered with the key phone 12 of the extension subscriber A2. However, an extension subscriber of an opposite PBX is not registered with the key phone 13 of the extension subscriber A3.

In the PBX B 20, extension subscribers A1 and A2 of the PBX A10 and extension subscriber C2 of the PBX C 30 are registered with the key phone 21 of the extension subscriber B1. An extension subscriber C3 of the PBX C 30 is registered with the key phone 22 of the extension subscriber B2.

Also, in the PBX C 30, extension subscribers A1 and A2 of the PBX A10 are registered with the key phone 31 of the extension subscriber C1. The extension subscriber A1 of the PBA A 10 is registered with the key phone 32 of the extension subscriber C2. Extension subscribers B1 and B2 of the PBX B 20 are registered with the key phone 33 of the extension subscriber C2. In the following discussion, the terms extension subscriber and key phone are used interchangeably.

As described above, the BLF information repeater 40 manages the extension status of each PBX using the reference table, changes the context of the reference table, and at the same time transmits the BLF information to the corresponding PBX.

Figure 7:
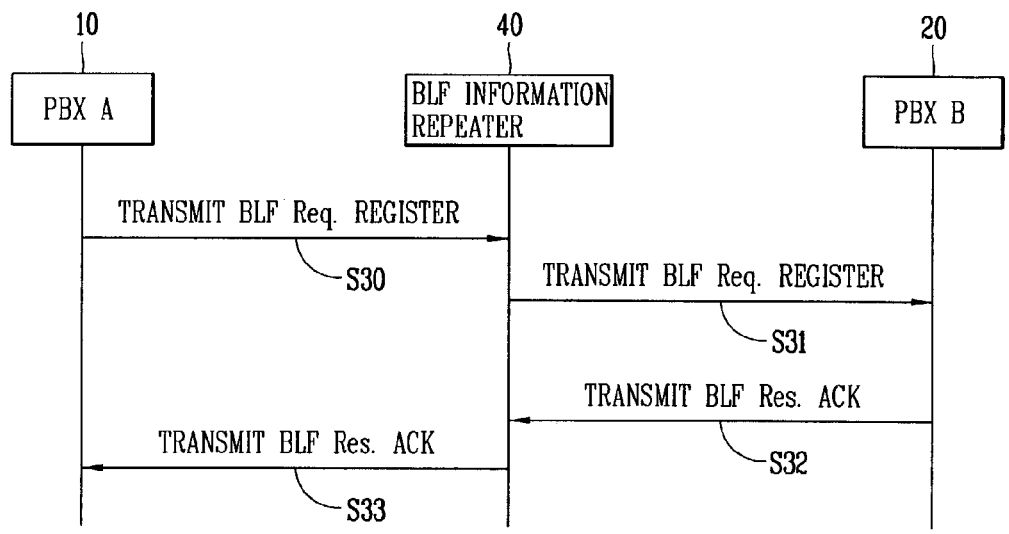
FIG. 7 is a flow chart of a process in which an extension subscriber of the PBX A registers the extension of the PBX B through a BLF information repeater in accordance with an embodiment of the invention.

FIG. 7 is a flow chart of a process in which an extension subscriber of PBX A 10 registers a subscriber of a different PBX with the key phone 11.

When the extension subscriber A1 of the PBX A 10 registers the subscriber B1 of the different PBX with its own key phone 11, the PBX A 10, to which the extension subscriber A1 belongs, transmits a BLF Req. Register message, which indicates a registration event to the BLF information repeater 40 in step S30. The BLF information repeater 40 then transmits the BLF Req. Register message to the PBX B 20, to which the extension subscriber B1 belongs, after recording the registration of the extension subscriber B1 in the reference table in step S31.

The PBX B 20 which received the BLF Req. Register message recognizes that the extension subscriber B1 is registered with the extension subscriber A1 of another PBX A 10 by transmitting a BLF Res. Ack message to the BLF information repeater 40 in step S32. Such reference information is stored in the PBX B 20. Therefore, the PBX B 20 does not transmit all of its subscriber information as did conventional devices, but transmits only the BLF information of the extension subscribers registered in the above registration process on the basis of the reference information.

When the BLF Res. Ack message is received from the PBX B 20, the BLF information repeater 40 transmits the corresponding BLF Res. Ack message to the PBX A 10. Accordingly, all of the processes for registering the extension subscriber B1 is completed in step S33.

Figure 8:
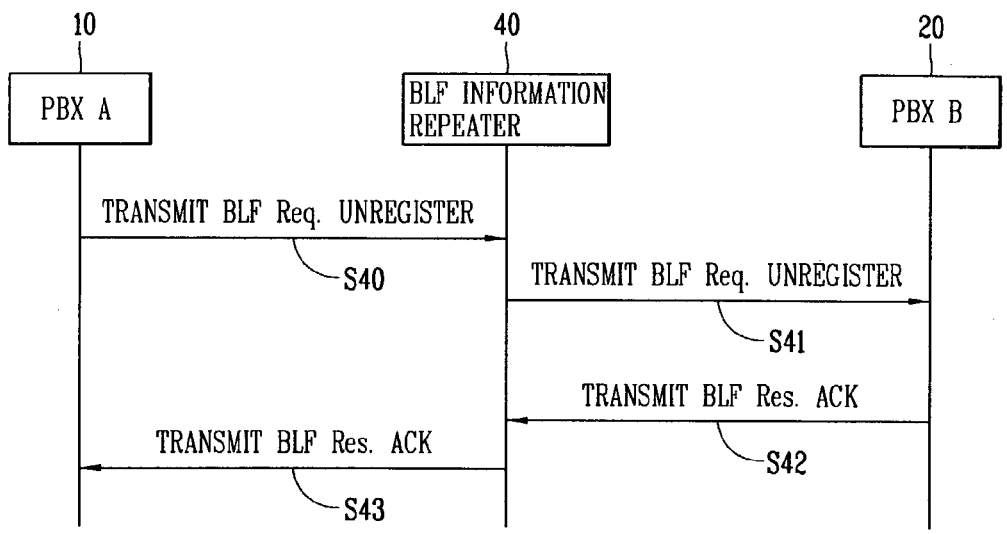
FIG. 8 is a flow chart of a process in which an extension subscriber of the PBX A unregisters the extension of the PBX B through a BLF information repeater in accordance with an embodiment of the invention.

FIG. 8 is a flow chart of a process in which an extension subscriber of the PBX A 10 unregisters a subscriber of another PBX from its key phone in accordance with an embodiment of the invention. When the extension subscriber A1 of the PBX A 10 unregisters the extension subscriber B1 of another PBX B 20, which is registered in its key phone 11, the PBX A 10 transmits a BLF Req. Unregister message, which indicates an unregistration event, to the information repeater 40 in step S40. The BLF information repeater 40 then updates its reference table on the basis of the transmitted BLF Req. Unregister message, and then transmits the BLF Req. Unregister message to the PBX B 20 to which the extension subscriber B1 belongs in step S41.

The PBX B 20, which receives the BLF Req. Unregister message, transmits a BLF Res. Ack message, which is a response message, to the BLF information repeater 40. The PBX B 20 recognizes that the extension subscriber B1 is no longer registered with the extension subscriber A1 of the PBX A 10 in step S42. The PBX B 20 deletes the extension subscriber B1 from the reference information, and BLF information about the extension subscriber B1 is no longer transmitted. When the BLF Res. Ack message is received from the PBX B 20, the BLF information repeater 40 transmits the corresponding BLF Res. Ack message to the PBX A 10 and the subscriber unregistration process is completed in step S43.

Figure 9:
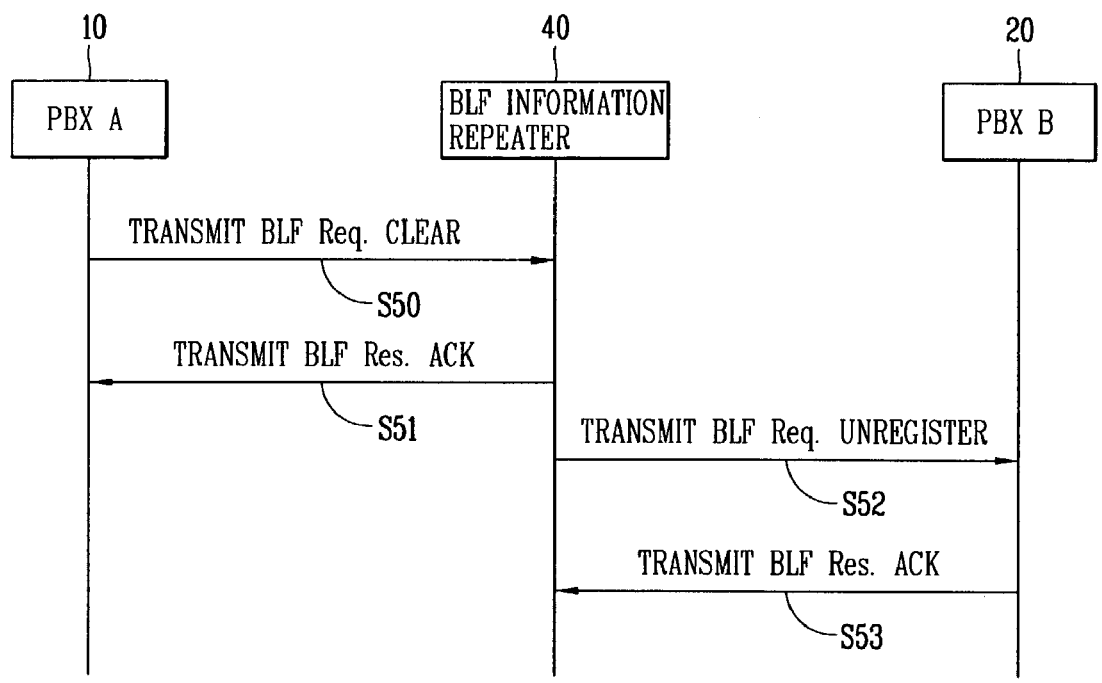
FIG. 9 is a flow chart of a process in which an extension subscriber of the PBX A clears the extension of the PBX B through a BLF information repeater in accordance with an embodiment of the invention.

FIG. 9 is a flow chart of a clearing process in which the BLF information repeater 40 in the case that the PBA A 10 is initialized or the database is broken in accordance with an embodiment of the invention.

In the case that the PBA A 10 is initialized or the database is broken, the PBX A 10 transmits a BLF Req. Clear message, which indicates a clear event, to the BLF information repeater 40. The BLF information repeater 40, which receives the BLF Req. Clear message, clears information about the PBX A 10 from the reference table, and then transmits the BLF Res. Ack message to the PBX A 10 in step S51. The BLF information repeater 40 clears the extension information of the PBX A 10, which is registered in the PBX B 20, by transmitting the BLF Req. Unregister message to the PBX B 20. The PBX B 20, which receives the BLF Req. Unregister message, clears the extension information A1 and A2 of the PBX A 10 from the pre-stored registration information and transmits the BLF Res. Ack message to the BLF information repeater 40 in step S53.

Also, in the case that the PBX A 10 is initialized or the database is broken, the PBX A 10 may transmit a BLF Req. Getdata message to the BLF information repeater 40 and can be provided with the extension information of the different PBX B 20 and PBX C 30 which are stored in the reference table of the BLF information repeater 40.

The apparatus and method according to the invention have at least the following advantages.

The apparatus and method according to the invention are capable of efficiently managing BLF information, transmitting a status of a subscriber of each private branch exchange (PBX). Also, the apparatus and corresponding method for managing busy lamp field (hereinafter BLF) information in an inter-networking system according to the invention are capable of reducing data transmission amount among PBXs and system load.

Further, the apparatus and corresponding method for managing BLF information in an inter-networking system according to the invention are capable of efficiently re-transmitting BLF information among respective PBXs. Furthermore, the apparatus and corresponding method for managing BLF information in an inter-networking system according to the invention are capable of collecting and managing BLF information of all PBXs.

As described above, each PBX transmits the BLF information to the BLF information repeater when its extension subscriber registers or unregisters an extension subscriber of an opposite PBX and/or when its extension subscriber removes the extension. The BLF information repeater collects the BLF information transmitted from each PBX and transmits the information to the extension subscriber which belongs to the corresponding PBX. Therefore, the invention can efficiently mange, store, and transmit BLF information among the respective PBXs using the BLF information repeater, thus reducing the amount of data transmitted among PBXs and reduce the load of the system.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An inter-networking system, comprising:
   a plurality of private branch exchanges (PBXs) configured to transmit busy lamp field (BLF) information; and
   an interface configured to receive and re-transmit BLF information received from the plurality of PBXs.

2. The system of claim 1, wherein the BLF information is transmitted through a user datagram protocol (UDP).

3. The system of claim 1, wherein the interface comprises a BLF information repeater configured to collect, manage, and re-transmit BLF information received from one or more of the plurality of PBXs to one or more other PBXs.

4. The system of claim 3, wherein the BLF information includes subscriber extension status information.

5. The system of claim 4, wherein the BLF information repeater has a reference table for managing the BLF information.

6. The system of claim 5, wherein the reference table stores subscriber extension status information of an opposite PBX which is registered with each PBX.

7. The system of claim 5, wherein the BLF information repeater manages the subscriber extension status of each PBX, and updates contents of the reference table when BLF information indicating extension registration, extension unregistration, and/or extension clear is inputted from each PBX.

8. The system of claim 7, wherein the BLF information repeater provides corresponding BLF information to the opposite PBX according to the reference table when the BLF information indicating extension registration, extension unregistration, and extension clear is inputted from each PBX.

9. The system of claim 7, wherein each PBX transmits BLF information about a stored extension subscriber by additionally storing its own extension state registered with the extension of the opposite PBX.

10. The system of claim 1, wherein the interface re-transmits BLF information received from one of the PBXs to remaining ones of the PBXs.

11. The system of claim 1, wherein said plurality of PBXs is two.

12. A method for managing busy lamp field (BLF) information in an inter-networking system, comprising:
    transmitting busy lamp field (BLF) information from one of a plurality of private branch exchanges (PBXs) to an interface; and
    re-transmitting the reported BLF information from the interface to another of the plurality of PBXs.

13. The method of claim 12, wherein the BLF information includes subscriber extension status information.

14. The method of claim 13, wherein the interface comprises a BLF information repeater and the method further comprises managing the BLF information received from each of the plurality of PBXs by storing the BLF information in the BLF information repeater.

15. The method of claim 14, wherein the step of managing the BLF information received from each of the plurality of PBXs by storing the BLF information in the BLF information repeater further comprises storing the BLF information in a reference table.

16. The method of claim 14, wherein the reference table stores the subscriber extension status information of an opposite PBX registered with each PBX.

17. The method of claim 15, further comprising updating the reference table with BLF information indicating extension registration, extension unregistration, and/or extension clear received from each PBX.

18. The method of claim 14, wherein the step of transmitting BLF information from one of a plurality of PBXs to an interface comprises transmitting the BLF information about a stored subscriber extension and the subscriber extension status of any subscriber extension registered with an opposite PBX.

19. The method of claim 18, wherein the step of transmitting BLF information from one of a plurality of PBXs to an interface comprises transmitting the BLF information to the BLF information repeater when the extension subscriber registers or unregisters an extension subscriber of the opposite PBX.

20. The method of claim 14, wherein the step of transmitting BLF information from one of a plurality of PBXs to an interface comprises transmitting the corresponding BLF information to the BLF information repeater in initializing the PBX or clearing the extension if the database is broken.

21. The method of claim 14, wherein the BLF information is transmitted through a user datagram protocol (UDP).

22. The method of claim 14, further comprising providing corresponding BLF information to the opposite PBX according to the reference table when the BLF information indicating extension registration, extension unregistration and/or extension clear is inputted from each PBX.

23. A method for managing busy lamp field (BLF) information in an inter-networking system, comprising:
    requesting conversion of an extension status in a private branch exchange (PBX) with a BLF information repeater when the extension status is converted;
    updating the extension status requested from the PBX in the BLF information repeater;
    re-transmitting the extension status of the updated PBX to another PBX; and
    managing the extension status registered with the opposite PBX on the basis of the re-transmitted extension status of the PBX; and
    transmitting the status of just the extension subscriber registered with the PBX when its extension status is converted.

24. The method of claim 23, further comprising storing and updating in a reference table the extension status requested in the PBX.

25. The method of claim 24, further comprising storing in the reference table the extension information of the opposite PBX which is registered with each PBX.

26. The method of claim 24, further comprising updating the reference table with the BLF information indicating extension registration, extension unregistration and/or extension clear transmitted from each PBX.

* * * * *